United States Patent
Dandoko

(10) Patent No.: US 10,630,851 B2
(45) Date of Patent: Apr. 21, 2020

(54) DISPLAY/INPUT DEVICE DEVICE ACCEPTING SETTINGS RELATED TO FUNCTIONS AND IMAGE FORMING APPARATUS THEREWITH

(71) Applicant: KYOCERA Document Solutions Inc., Osaka (JP)

(72) Inventor: Takushi Dandoko, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/293,106

(22) Filed: Mar. 5, 2019

(65) Prior Publication Data
US 2019/0306348 A1    Oct. 3, 2019

(30) Foreign Application Priority Data
Mar. 29, 2018 (JP) ................................. 2018-065173

(51) Int. Cl.
*H04N 1/00* (2006.01)
*G06F 3/0484* (2013.01)
*H04N 1/44* (2006.01)

(52) U.S. Cl.
CPC ..... *H04N 1/00514* (2013.01); *G06F 3/04847* (2013.01); *H04N 1/00411* (2013.01); *H04N 1/4413* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2011/0246943 | A1* | 10/2011 | Fujibayashi | G06F 3/0488 715/833 |
| 2012/0293679 | A1* | 11/2012 | Aiba | H04N 9/8205 348/222.1 |
| 2013/0038546 | A1 | 2/2013 | Mineo | 345/173 |
| 2016/0012048 | A1* | 1/2016 | Yellin | G06F 16/435 707/722 |

FOREIGN PATENT DOCUMENTS

JP    2013-37556 A    2/2013

* cited by examiner

*Primary Examiner* — Andrew H Lam
(74) *Attorney, Agent, or Firm* — Stein IP, LLC

(57) ABSTRACT

A display/input device includes a touch screen which accepts an operation of moving a slider image on a bar image in an extension direction, in which the bar image extends, a controller, and a storage which stores therein an allowable range. In performing range limiting processing, the controller makes the touch screen display the bar image such that, of the bar image, an in-range region, which corresponds to the allowable range, and an out-of-range region, which is a region other than the in-range region, are displayed in different display fashions, and limits a movable range of the slider image to a range from one end to an other end of the in-range region which are opposite from each other in the extension direction.

7 Claims, 9 Drawing Sheets

PASSWORD INPUT ACCEPTANCE CONDITION (FIRST CONDITION) : FULFILLED

PASSWORD INPUT ACCEPTANCE CONDITION (SECOND CONDITION)  FULFILLED

US 10,630,851 B2

DISPLAY/INPUT DEVICE DEVICE ACCEPTING SETTINGS RELATED TO FUNCTIONS AND IMAGE FORMING APPARATUS THEREWITH

INCORPORATION BY REFERENCE

This application is based upon and claims the benefit of priority from the corresponding Japanese Patent Application No. 2018-065173 filed on Mar. 29, 2018, the entire contents of which are incorporated herein by reference.

BACKGROUND

The present disclosure relates to a display/input device that displays a screen and accepts an operation performed by a user, and relates to an image forming apparatus therewith.

An image forming apparatus accepts, from a user, various settings such as job-related settings and system-related settings. Such an image forming apparatus is provided with a display/input device for accepting settings from the user.

The display/input device accepts, from the user, settings (adjustment) related to functions of the image forming apparatus. Such settings are accepted via a slider user interface (slider UI).

SUMMARY

According to a first aspect of the present disclosure, a display/input device includes a touch screen, a controller, and a storage. The touch screen displays a bar image, displays a slider image on the bar image, and accepts, from a user, an operation of moving the slider image in an extension direction of the bar image as an input operation. The controller controls the touch screen, and recognizes a value corresponding to a position of the slider image on the bar image as a value that the user intends to input. The storage stores therein an allowable range which is a range of a value that is allowed to input in the input operation and which is a range set in advance. In performing range limiting processing of putting a limit on a movable range of the slider image based on the allowable range, the controller makes the touch screen display the bar image such that, of the bar image, an in-range region, which corresponds to the allowable range, and an out-of-range region, which is a region other than the in-range region, are displayed in different display fashions, and limits a movable range of the slider image to a range from one end to an other end of the in-range region which are opposite from each other in the extension direction.

According to a second aspect of the present disclosure, an image forming apparatus includes the above-described display/input device.

DETAILED DESCRIPTION

Hereinafter, a description will be given of an image forming apparatus provided with a display/input device according to an embodiment of the present disclosure, dealing with, as an example, a multifunction peripheral equipped with a plurality of functions including a copying function.

Figure 1:
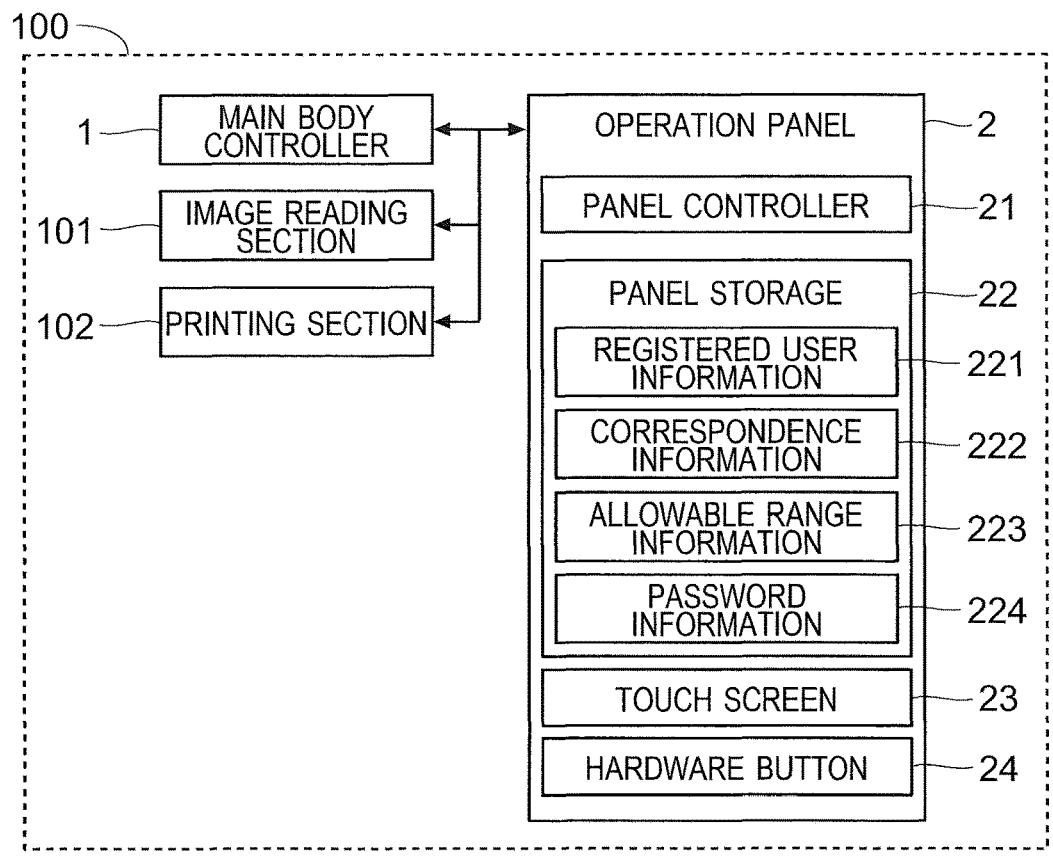
FIG. 1 is a block diagram illustrating a configuration of a multifunction peripheral including an operation panel according to an embodiment of the present disclosure.

Configuration of Multifunction Peripheral:

As illustrated in FIG. 1, a multifunction peripheral 100 (corresponding to "an image forming apparatus") of this embodiment is provided with a main body controller 1. The main body controller 1 includes a CPU, and performs overall control of the multifunction peripheral 100.

The main body controller 1 is connected to an image reading section 101 and a printing section 102. The image reading section 101 reads a document, and generates image data of the read document. The printing section 102 forms an image, and prints the formed image on a sheet. The main body controller 1 controls the reading operation performed by the image reading section 101 and also controls the printing operation performed by the printing section 102.

The multifunction peripheral 100 also includes an operation panel 2. The operation panel 2 corresponds to "a display/input device". The operation panel 2 includes a panel controller 21 and a panel storage 22. The panel controller 21 corresponds to "a controller", and the panel storage 22 corresponds to "a storage".

The panel controller 21 includes a CPU. The panel controller 21 is connected to the main body controller 1. The panel controller 21 receives, from the main body controller 1, an instruction related to control of the operation panel 2. The panel controller 21 operates based on a control program and control data, and performs processing for controlling the operation panel 2.

The panel storage 22 includes memories (a ROM and a RAM). The panel storage 22 stores therein the control program and the control data. The panel storage 22 is connected to the panel controller 21. The panel controller 21 reads information from the panel storage 22 and writes information to the panel storage 22.

For accepting operations from the user, the operation panel 2 includes a touch screen 23 and a hardware button 24. The touch screen 23 is connected to the panel controller 21. The panel controller 21 controls a display operation of the touch screen 23, and detects an operation performed on the touch screen 23 (a software button). The panel controller 21 also detects an operation performed with respect to the hardware button 24.

The touch screen 23 displays a screen, and accepts, from the user, an operation with respect to the displayed screen (a software button). As the hardware button 24, a plurality of hardware buttons 24 are provided on the operation panel 2. The hardware buttons 24 include, for example, a start button for accepting an instruction to execute a job from the user.

Here, the multifunction peripheral 100 (the operation panel 2) is equipped with a user authentication function. When the user authentication function is activated, the user, who wants to use the multifunction peripheral 100, needs to login the multifunction peripheral 100. In other words, the user, who wants to use the multifunction peripheral 100, needs to undergo user authentication (personal identification).

For example, the user authentication is performed by the panel controller 21. In the user authentication performed by the panel controller 21, registered user information 221 is used. The registered user information 221 includes user information (a user ID and a password) which the user has registered in advance, and is stored in the panel storage 22. Here, a plurality of users use the multifunction peripheral 100, and the registered user information 221 of each user is stored in the panel storage 22.

In a case where the user authentication function is set active, the panel controller 21 makes the touch screen 23 display a login screen (not shown) as an initial screen (a screen displayed when the main power supply of the multifunction peripheral 100 is turned on or on recovery from a sleep state). The login screen is a screen for accepting an input of user information (a user ID and a password) from a user. For the user authentication, a user inputs his or her user information. When the user information is inputted, the panel controller 21 performs user authentication based on the entered user information.

When performing the user authentication (when user information is inputted), the panel controller 21 retrieves registered user information 221 that is identical with the inputted user information. When such registered user information 221 as is identical with the inputted user information is present, the panel controller 21 judges that the user currently undergoing the user authentication is a registered user, and makes a shift into a login state. Consequently, the user can use the multifunction peripheral 100.

When, on the other hand, the panel controller 21 judges that the user currently undergoing the user authentication is not a registered user (in other words, no such registered user information 221 as is identical with the inputted user information is present), the panel controller 21 does not make a shift into the login state. Consequently, the user cannot use the multifunction peripheral 100.

Here, in a case where the user authentication function is set inactive, a user is allowed to use the multifunction peripheral 100 without login to the multifunction peripheral 100.

Figure 2:
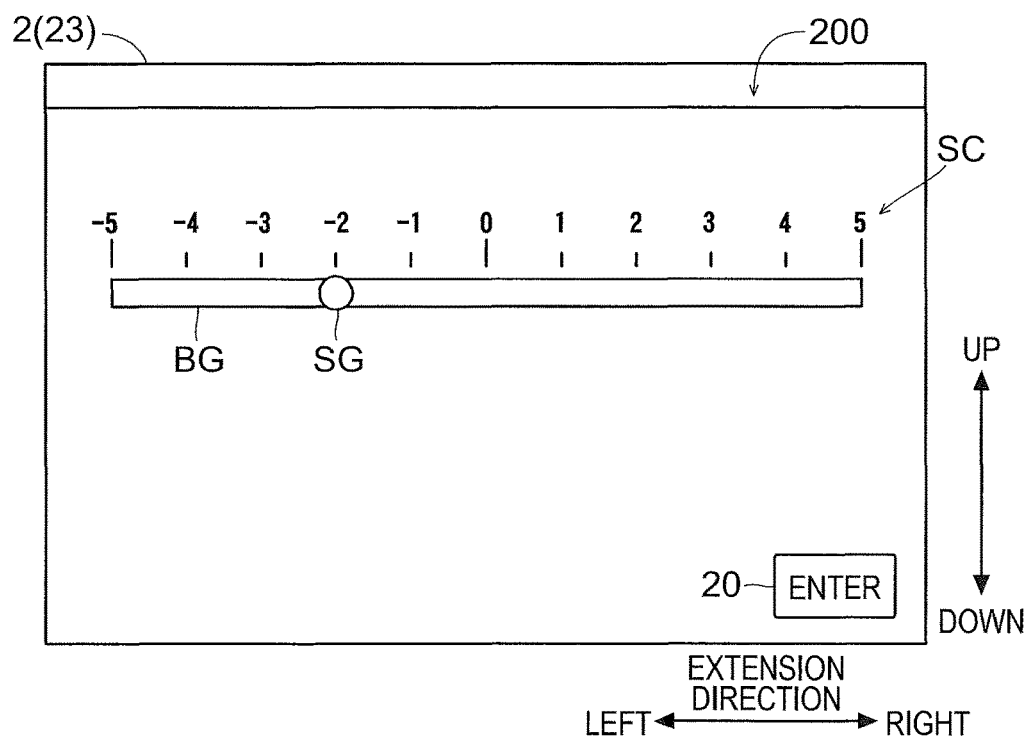
FIG. 2 is a diagram illustrating a setting screen which is displayed on the operation panel according to the embodiment of the present disclosure.

Acceptance of Settings Using Slider UI:

To make job-related settings or system-related-settings, the user operates the operation panel 2 to make the operation panel 2 display a screen corresponding to a setting item of a setting target. When the setting item of the setting target is the density (the density of an image printed by the printing section 102 on a sheet), the sound volume (the volume of electronic sound from the operation panel 2), or the like, the slider UI (user interface) is used to for acceptance of a setting. To accept a setting by using the slider UI, a setting screen 200 as illustrated in FIG. 2, for example, is displayed on the operation panel 2.

The setting screen 200 accepts an input operation of inputting a value within a rage between maximus and minimum values settable as a setting value. There are various setting items, in addition to the density and the sound volume, of which setting is accepted by means of the slider UI. The maximum and minimum settable values are determined in advance with respect to each setting item.

The panel controller 21 makes the touch screen 23 display, as the setting screen 200, a screen in which a bar image BG and a slider image SG are arranged. At this time, the touch screen 23 displays the bar image BG having an elongated shape (a rectangular shape) extending in a left-right direction of the screen, and also displays the slider image SG having a circular shape on the bar image BG (in the display region of the bar image BG). Consequently, the slider image SG is overlaid on part of the bar image BG. Then, the touch screen 23 accepts, as an input operation (an operation of inputting a value), a touch operation of moving the slider image SG on the bar image BG in the direction in which the bar image BG extends. For example, accepted by the touch screen as an input operation is a slide operation (a drag operation) in which a contact body (such as a finger, a touch pen, or the like) is brought into contact with the display region of the slider image SG on the touch screen 23, and then the contact body is moved in an extension direction of the bar image BG while being maintained in contact with the touch screen 23.

The panel controller 21 makes the touch screen 23 display the slider image SG such that, when the slide operation (an input operation) is being performed with respect to the touch screen 23, the slider image SG follows an operation position (a contact position at which the contact body is in contact with the touch screen 23). Then, when the contact of the contact body with respect to the touch screen 23 is released, the panel controller 21 judges that the input operation is finished. At this time, the panel controller 21 makes the slider image SG stay displayed on the bar image BG (in the display region of the bar image BG), at the position at which the slider image SG is located at the time point when the input operation is finished.

When the input operation with respect to the touch screen 23 is finished, the panel controller 21 recognizes a value corresponding to the position of the center of the slider image SG in the left-right direction (the direction in which the bar image BG extends) as a value that the user intends to input. For example, correspondence information 222 (see FIG. 1) indicating the correspondence between positions of the slider image SG on the bar image BG and input values is stored in the panel storage 22 in advance. The panel controller 21 recognizes, based on the correspondence information 222, a value corresponding to the position of the slider image SG on the bar image BG (that is, the value the user intends to input).

For example, the length of the bar image BG in the extension direction corresponds to the range between the maximum and minimum values that are settable as setting values. The bar image BG is provided with a scale SC having graduations dividing the range at predetermined intervals. Illustrated in the example shown in FIG. 2 is a setting screen 200 (the bar image BG) corresponding to a setting item for which the maximum and minimum values settable as a setting value are "5" and "−5", respectively.

Further, on the setting screen 200 including the bar image BG (the slider image SG), there is arranged an enter button 20. To confirm a value having been inputted in the input operation, the user needs to perform an operation with respect to the enter button 20 after the input operation.

When an operation is performed with respect to the enter button 20, the panel controller 21 recognizes, as a confirmed value, a value corresponding to the position of the slider image SG on the bar image BG at the time when the operation is performed. Then, the panel controller 21 transmits the confirmed value to the main body controller 1. The main body controller 1 recognizes a current setting value for the setting item corresponding to the confirmed value, and replaces the recognized current setting value with the confirmed value.

Range Limiting Processing:

The panel storage 22 stores therein allowable range information 223 (see FIG. 1) which indicates an allowable range, which has been set by the user in advance. The allowable range indicated by the allowable range information 223 is a range of value that is allowed to be inputted through setting by using the slider UI (an input operation with respect to the setting screen 200). On accepting settings, if there are a plurality of setting items with respect to which settings are to be made by using the slider UI, setting of the allowable range is performed for each of the plurality of setting items.

Here, a plurality of users are classified into two categories of general user and particular user. For example, a manager who is in charge of the management of the multifunction peripheral 100 is classified as a particular user, and the other users are classified as general users. It is only the particular user that is authorized to set an allowable range. Here, a plurality of pieces of the registered user information 221 each include user classification information which indicates whether the corresponding user is a general user of a particular user.

While the multifunction peripheral 100 is being used, the panel controller 21 recognizes whether the user who is currently using the multifunction peripheral 100 is a general user or a particular user. In other words, when the operation panel 2 is being operated, the panel controller 21 recognizes whether the user who is currently operating the operation panel 2 is a general user or a particular user.

For example, the panel controller 21 judges whether a login user who is currently logging in the multifunction peripheral 100 is a general user or a particular user based on the user classification information included in the registered user information 221 of the login user. When the login user is a general user, the panel controller 21 recognizes that the user who is currently using the multifunction peripheral 100 (the user who is currently operating the operation panel 2) is a general user. On the other hand, if the login user is a particular user, the panel controller 21 recognizes that the user who is currently using the multifunction peripheral 100 (the user who is currently operating the operation panel 2) is a particular user. In a case where the multifunction peripheral 100 is being used with the user authentication function set to be inactive, the panel controller 21 recognizes the user who is currently using the multifunction peripheral 100 as a general user.

And, when accepting, from a user, a setting made by using the slider UI (an input operation with respect to the setting screen 200), if it is a general user who is using the multifunction peripheral 100, the panel controller 21 performs range limiting processing. On the other hand, if it is a particular user who is using the multifunction peripheral 100, the panel controller 21 does not perform the range limiting processing.

Hereinafter, with reference to the flowchart illustrated in FIG. 3, a description will be given of a flow of the range limiting processing performed by the panel controller 21. According to the flowchart illustrated in FIG. 3, the flow starts when the operation panel 2 accepts, from a user, a setting made by using the slider UI. Here, it is assumed that the screen displayed on the operation panel 2 at the time when the setting made by using the slider UI is accepted is the setting screen 200 (see FIG. 2). In the following description, for the sake of convenience, a setting item corresponding to the setting screen 200 will be referred to as a target setting item.

In step S1, the panel controller 21 judges whether or not the user who is currently using the multifunction peripheral 100 is a general user. In a case where, as a result, the panel controller 21 has judged that the user who is currently using the multifunction peripheral 100 is a general user, the panel controller 21 performs the range limiting processing. The panel controller 21 performs steps S2 through S5 as the range limiting processing.

Specifically, in step S2, the panel controller 21 recognizes an allowable range corresponding to the target setting item based on the allowable range information 223. Here, it is assumed that the allowable range corresponding to the target setting item is "−5" through "2". Further, in step S3, the panel controller 21 performs, as part of the range limiting processing, region setting processing of setting such a region in the display region of the bar image BG as corresponds to the allowable range as an in-range region A1 (see FIG. 4), and setting a region in the display region of the bar image BG excluding the in-range region A1 as an out-of-range region A2 (see FIG. 4).

Then, in step S4, the panel controller 21 makes the touch screen 23 display the setting screen 200 (see FIG. 4) corresponding to the target setting item. That is, the panel controller 21 makes the touch screen 23 display the bar image BG and the slider image SG. At this time, the panel controller 21 performs, as part of the range limiting processing, processing of making the touch screen 23 display the bar image BG such that, in the display region of the bar image BG, the in-range region A1 and the out-of-range region A2 are displayed in different display fashions.

Figure 4:
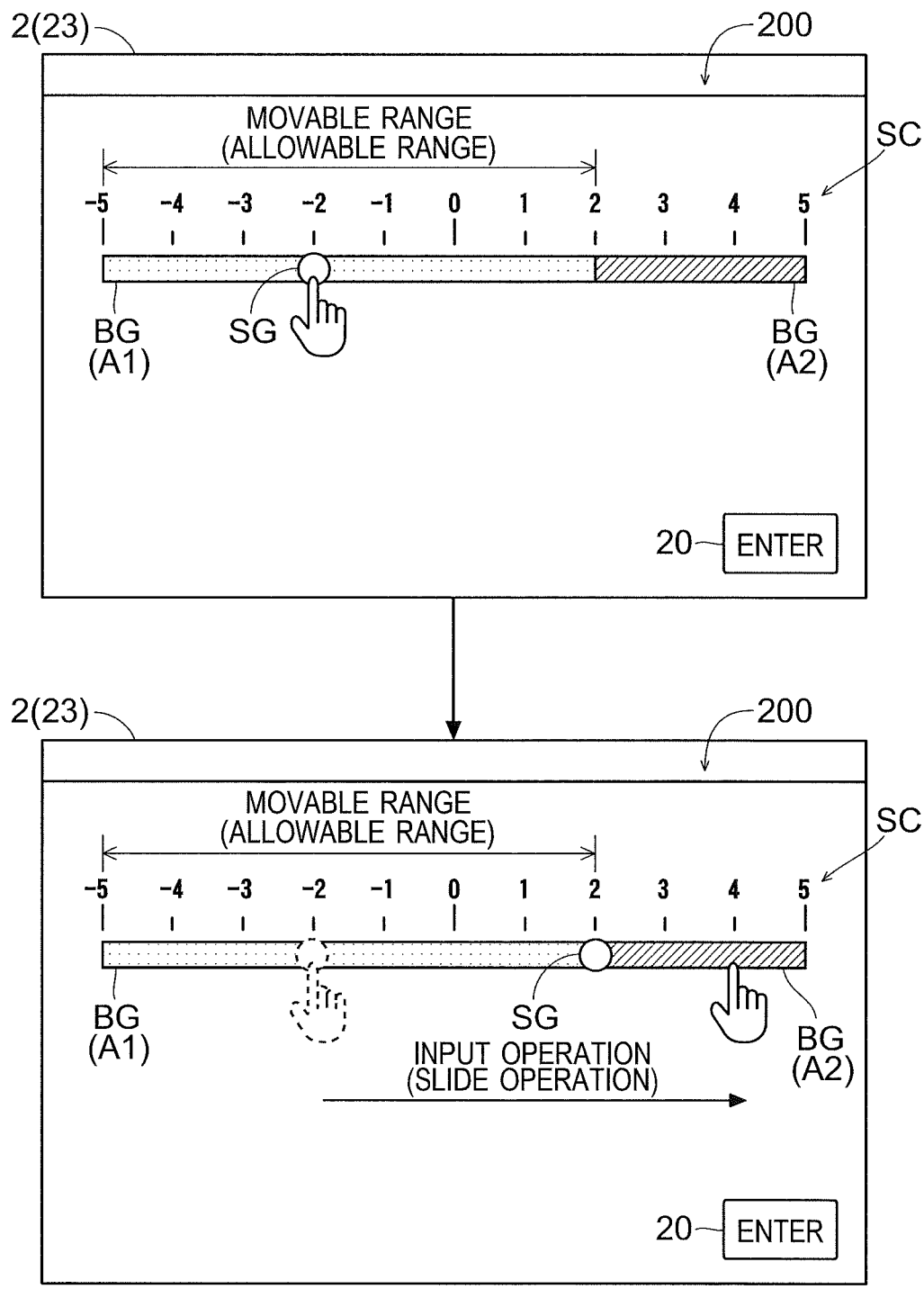
FIG. 4 is a diagram for illustrating a movable range of a slider image when the panel controller of the operation panel according to the embodiment of the present disclosure is performing the range limiting processing.

For example, as illustrated in FIG. 4, the touch screen 23 displays the in-range region A1 and the out-of-range region A2, of the display region of the bar image BG, in colors different from each other. In FIG. 4, the difference in display color is described by indicating the in-range region A1 with dots and indicating the out-of-range region A2 with hatching. Here, although not shown, the width of the in-range region A1 in the up-down direction which is orthogonal to the left-right direction (the extension direction of the bar image BG) may be wider than the width of the out-of-range region A2 in the up-down direction, or, the in-range region A1 may be outlined with a thicker line than the out-of-range region A2.

Figure 3:
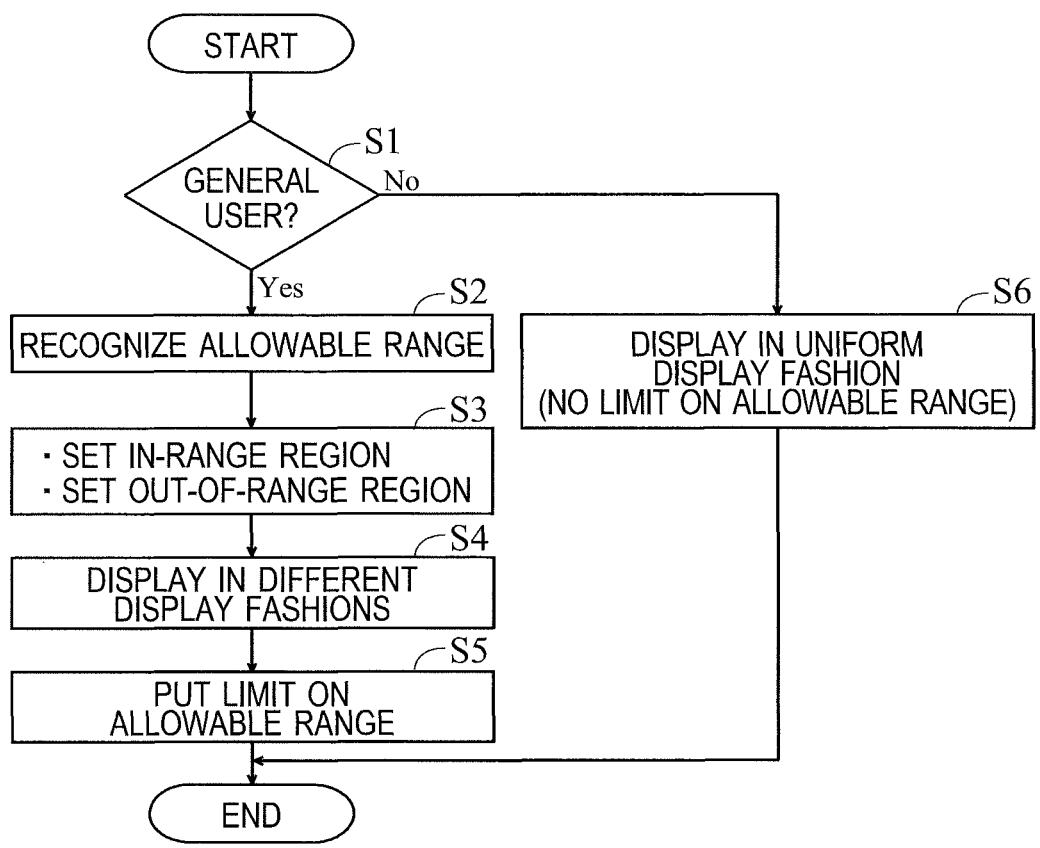
FIG. 3 is a flowchart illustrating a flow of range limiting processing performed by a panel controller of the operation panel according to the embodiment of the present disclosure.

Back to FIG. 3, after the setting screen 200 is displayed, in step S5, the panel controller 21 gives the touch screen 23 an instruction, and performs, as part of the range limiting processing, processing of limiting the movable range of the slider image SG to a range from one end to the other end of the in-range region A1 that are opposite from each other in the left-right direction (the extension direction of the bar image BG). That is, the touch screen 23 does not allow the slider image SG to move outside the in-range region A1 (that is, into the out-of-range region A2).

Here, the panel controller 21 recognizes the position of the center of the slider image SG in the left-right direction (the extension direction of the bar image BG) as the position of the slider image SG on the bar image BG. Thus, when the slider image SG is located at an end of the in-range region A1 in the left-right direction, part of the slider image SG is located outside the in-range region A1.

In the case where the allowable range is from "−5" through "2", as illustrated in FIG. 4, in the display region of the bar image BG, a region corresponding to the range from "−5" through "2" is the in-range region A1, and a region corresponding to the range from "2" through "5" is the out-of-range region A2. In this case, in an input operation with respect to the setting screen 200 (a slide operation with respect to the slider image SG), a value that is equal to or larger than "−5" but equal to or smaller than "2" can be inputted, but a value that is larger than "2" cannot be inputted. This is because, in the display region of the bar image BG, the slider image SG cannot be moved to a position corresponding to values larger than "2". Even if the user, in trying to input a value (here, referred to as a predetermined value) that is larger than "2", brings a contact body into contact with the display region of the bar image BG at a position corresponding to the predetermined value, the slider image SG stays within the in-range region A1 (at the position corresponding to "2"). That is, a change occurs from the state illustrated in the upper diagram of FIG. 4 to the state illustrated in the lower diagram of FIG. 4. In FIG. 4, a position at which the contact body is in contact with the touch screen 23 is indicated by a finger mark.

Back to FIG. 3, in step S1, in a case where the panel controller 21 has judged that the user who is currently using the multifunction peripheral 100 is not a general user, the flow proceeds to step S6. That is, if the user who is currently using the multifunction peripheral 100 is a particular user, the flow proceeds to step S6.

In step S6, the panel controller 21, without performing the region setting processing, makes the touch screen 23 display the setting screen 200 (the bar image BG and the slider image SG) corresponding to the target setting item. At this time, the panel controller 21 does not perform the processing of putting a limit on the movable range of the slider image SG.

Figure 5:
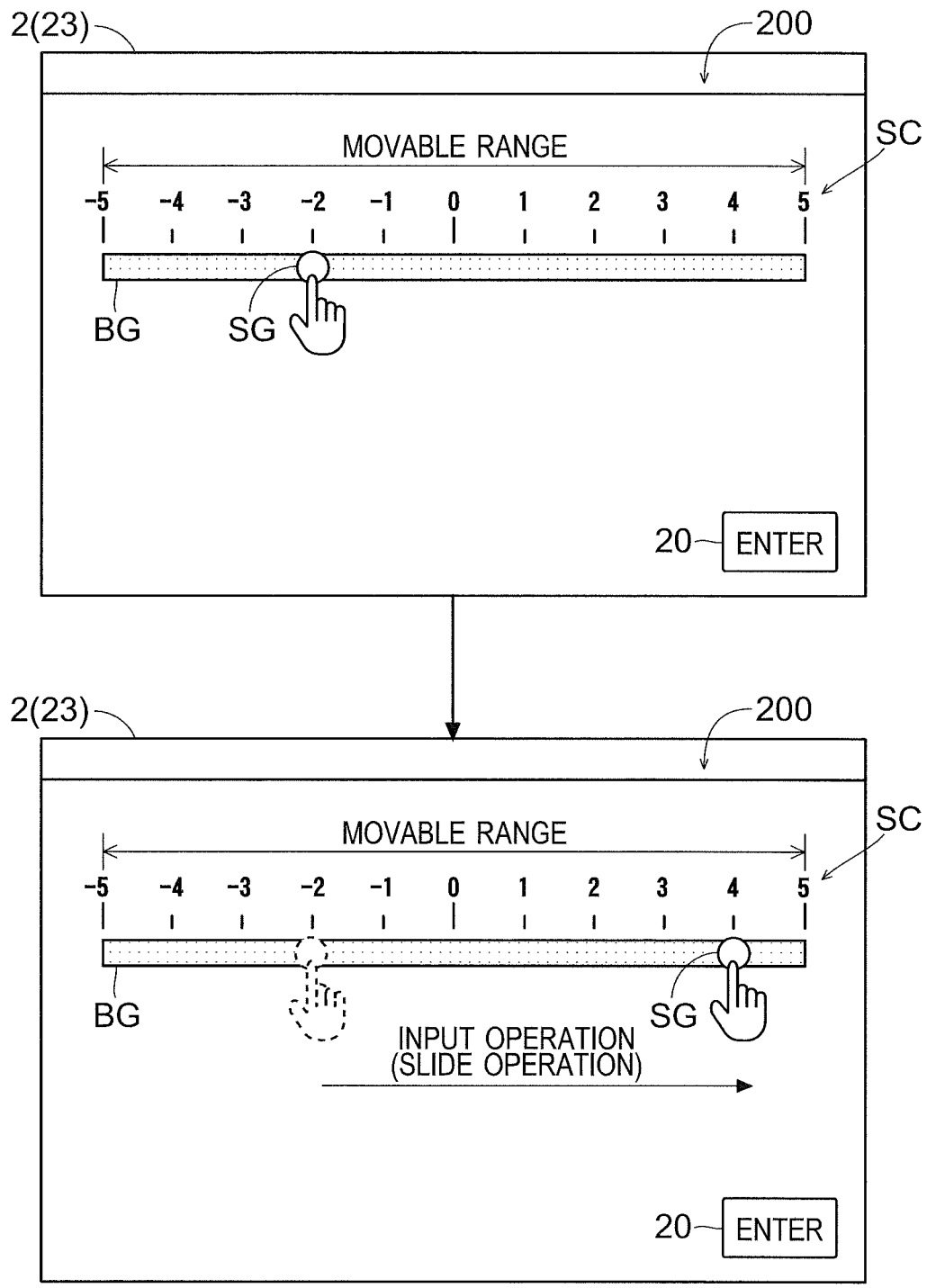
FIG. 5 is a diagram for illustrating the movable range of the slider image when the panel controller of the operation panel according to the embodiment of the present disclosure is not performing the range limiting processing.

In a case where no limit is put on the movable range of the slider image SG, as illustrated in FIG. 5, the touch screen 23 displays the entire display region of the bar image BG in the same display manner (for example, the same display manner as the in-range region A1). And, the panel controller 21 sets, as the movable range of the slider image SG, a range from one end to the other end of the display region of the bar image BG, which are opposite from each other in the left-right direction (the extension direction of the bar image BG). Accordingly, in a case where a limit is put on the movable range of the slider image SG, the slider image SG cannot be moved to a position in the display region of the bar image BG corresponding to a value larger than "2", while in the case where no limit is put on the movable range of the slider image SG, the slider image SG can be moved to a position in the display region of the bar image BG corresponding to a value larger than "2". That is, when the user, trying to input a value (here, the predetermined value) that is larger than "2", brings the contact body into contact with the display region of the bar image BG at a position corresponding to the predetermined value, the slider image SG moves to the position corresponding to the predetermined value. That is, a change occurs from the state illustrated in the upper diagram of FIG. 5 to the state illustrated in the lower diagram of FIG. 5. In FIG. 5, a position at which the contact body is in contact with the touch screen 23 is indicated by a finger mark.

Limit Cancellation Processing:

The panel controller 21 performs limit cancellation processing of cancelling the limit put on the movable range of the slider image SG on the bar image BG. To cancel the limit put on the movable range of the slider image SG, a cancellation password is necessary which a particular user has registered in advance. Password information 224 (see FIG. 1) which indicates the cancellation password is stored in the panel storage 22. For example, a password indicated in the registered user information 221 of the particular user may be set as the cancellation password.

Here, when a general user is using the multifunction peripheral 100, the panel controller 21 performs, as part of the limit cancellation processing, condition judging processing of judging whether or not a password input acceptance condition has been fulfilled. Further, when the password input acceptance condition has been fulfilled, the panel controller 21 makes the touch screen 23 accept the input of a password, and performs, as part of the limit cancellation processing, processing of judging whether or not the input password which has been inputted is identical with the cancellation password. Then, if the input password and the cancellation password are identical with each other, the panel controller 21 cancels the limit put on the movable range of the slider image SG. That is, the panel controller 21 finishes the range limiting processing.

Hereinafter, with reference to the flowchart illustrated in FIG. 6, a description will be given of a flow of the limit cancellation processing performed by the panel controller 21. In the flowchart illustrated in FIG. 6, the flow starts when, with a general user using the multifunction peripheral 100, a screen for accepting, from the user, a setting made by using the slider UI is displayed on the operation panel 2. Here, it is assumed that the screen displayed on the operation panel 2 is the setting screen 200 (see FIG. 2). In the following description, for the sake of convenience, a setting item corresponding to the setting screen 200 will be referred to as a target setting item. Here, at the time point when the setting screen 200 is displayed on the touch screen 23, since a general user is using the multifunction peripheral 100, the panel controller 21 performs the range limiting processing.

In step S11, the panel controller 21 performs the condition judging processing of judging whether or not the password input acceptance condition has been fulfilled. Here, if it is highly possible that the user intends to input a value that is out of the allowable range corresponding to the target setting item, the panel controller 21 judges that the password input acceptance condition has been fulfilled. Hereinafter, the password input acceptance condition will be described.

As the password input acceptance condition, there are prepared, in advance, a first condition, a second condition, a third condition, and a fourth condition. It is up to a particular user which of the first to fourth conditions should be selected as the password input acceptance condition. The panel controller 21 sets a condition selected by the particular user from among the first to fourth conditions as the password input acceptance condition.

Figure 7:
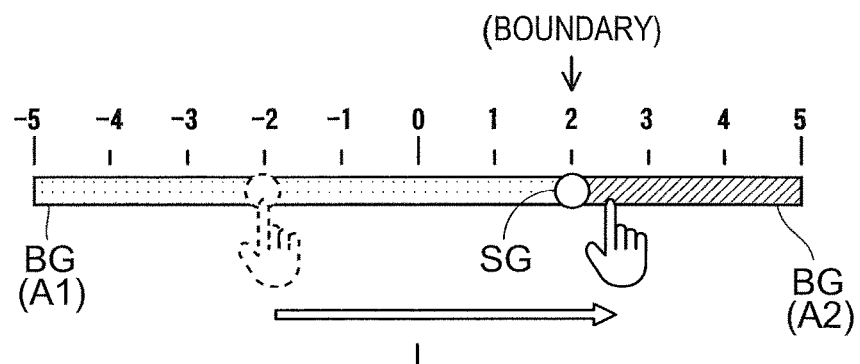
FIG. 7 is a diagram for illustrating condition judgment processing (processing of judging whether or not a first condition is fulfilled) which the panel controller of the operation panel according to the embodiment of the present disclosure performs as processing in the limit cancellation processing.

In a case where the first condition is set as the password input acceptance condition, as illustrated in FIG. 7, on detecting that an operation position (a contact position at which the contact body is in contact with the touch screen 23) in a slide operation as an input operation having been started in the in-range region A1 has moved from the in-range region A1 into the out-of-range region A2, the panel controller 21 judges that the password input acceptance condition has been fulfilled. In FIG. 7, the operation position in the slide operation is indicated by a finger mark, and the direction in which the slide operation is performed is indicated by an arrow outline with white inside. Further, in FIG. 7, for the sake of convenience, only the bar image BG, the slider image SG, and the scale SC are illustrated from among all screen elements of the setting screen 200. This is applied also to FIG. 8 to FIG. 10, which will be referred to in the following description.

Figure 8:
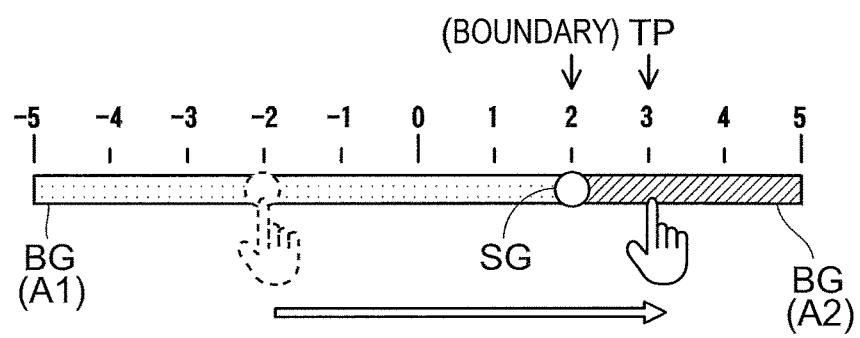
FIG. 8 is a diagram for illustrating condition judgment processing (processing of judging whether or not a second condition is fulfilled) which the panel controller of the operation panel according to the embodiment of the present disclosure performs as processing in the limit cancellation processing.

In a case where the second condition is set as the password input acceptance condition, as illustrated in FIG. 8, the panel controller 21 sets a position that is away from the boundary between the in-range region A1 and the out-of-range region A2 toward the out-of-range region A2 by a predetermined distance (corresponding to one graduation-to-graduation interval in FIG. 8) as a threshold position TP. Then, on detecting that an operation position (a contact position at which the contact body is in contact with the touch screen 23) in a slide operation as an input operation having been started in the in-range region A1 has moved from the in-range region A1 to the threshold position TP, the panel controller 21 judges that the password input acceptance condition has been fulfilled. In this case, even when the operation position in the slide operation is moved from the in-range region A1 into the out-of-range region A2, unless the operation position in the slide operation has reached the threshold position TP, the panel controller 21 does not judge that the password input acceptance condition has been fulfilled.

Figure 9:
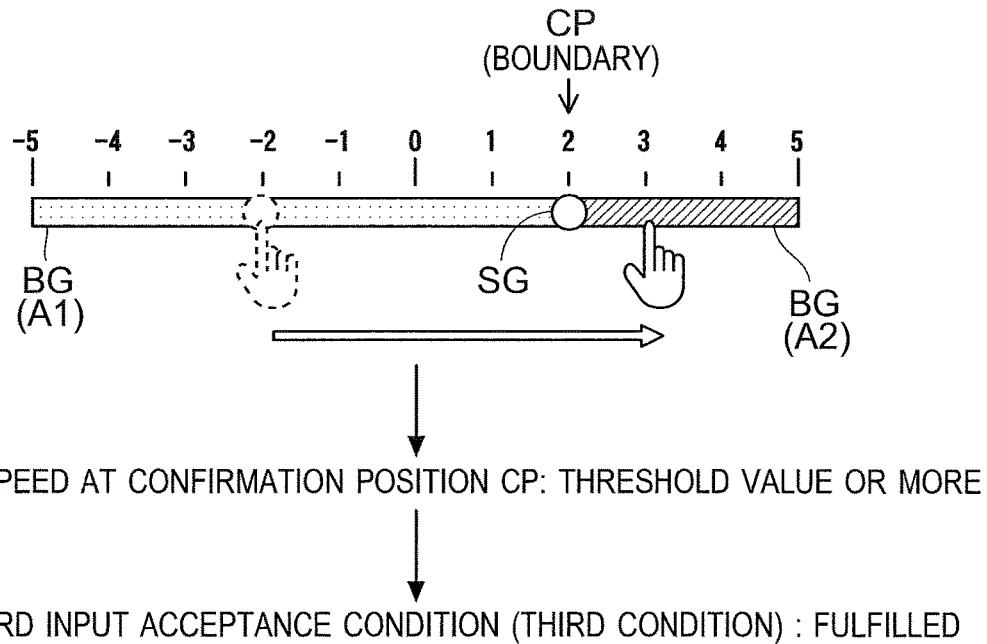
FIG. 9 is a diagram for illustrating condition judgment processing (processing of judging whether or not a third condition is fulfilled) which the panel controller of the operation panel according to the embodiment of the present disclosure performs as processing in the limit cancellation processing.

In a case where the third condition is set as the password input acceptance condition, as illustrated in FIG. 9, the panel controller 21 sets a confirmation position CP on the boundary between the in-range region A1 and the out-of-range region A2. Further, the panel controller 21 detects a moving speed in a slide operation performed as an input operation having been started in the in-range region A1. Then, on detecting that the moving speed at the confirmation position CP in the slide operation that is being performed from the in-range region A1 toward the out-of-range region A2 is equal to or more than a previously determined threshold value, the panel controller 21 judges that the password input acceptance condition has been fulfilled. In this case, even when the operation position in the slide operation is moved from the in-range region A1 into the out-of-range region A2, unless the moving speed of the slide operation at the confirmation position CP (corresponding to the boundary between the in-range region A1 and the out-of-range region A2) is less than the threshold value, the panel controller 21 does not judge that the password input acceptance condition has been fulfilled.

Figure 10:
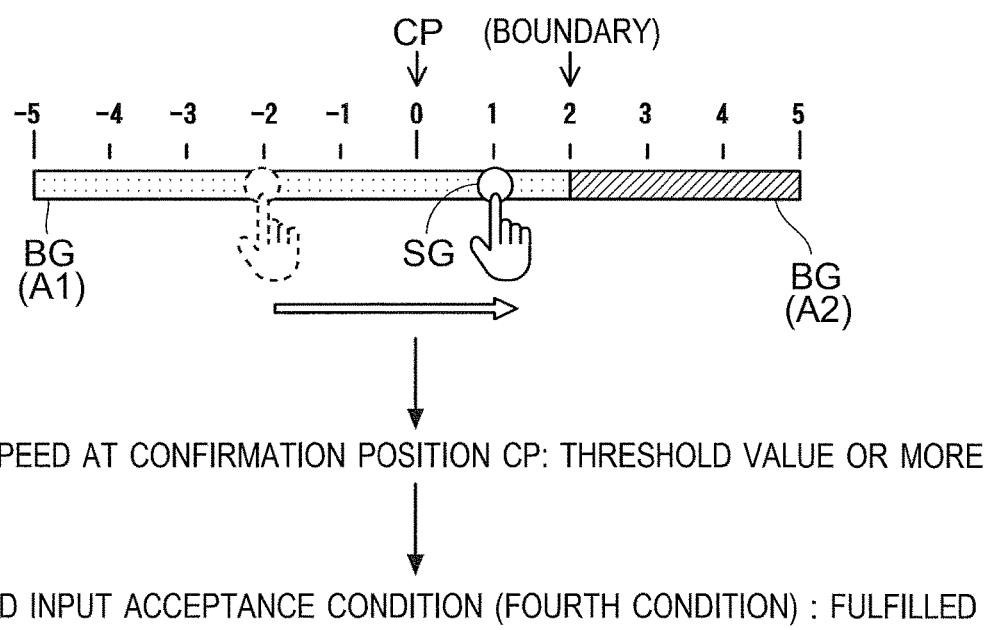
FIG. 10 is a diagram for illustrating condition judgment processing (processing of judging whether or not a fourth condition is fulfilled) which the panel controller of the operation panel according to the embodiment of the present disclosure performs as processing in the limit cancellation processing.

In a case where the fourth condition is set as the password input acceptance condition, as illustrated in FIG. 10, the panel controller 21 sets a confirmation position CP (at the position corresponding to a graduation that indicates "0" in FIG. 10) between one end and the other end of the in-range region A1 which are opposite from each other in the left-right direction (the extension direction of the bar image BG). Further, the panel controller 21 detects a moving speed in a slide operation performed as an input operation having been started in the in-range region A1. Then, on detecting that the moving speed at the confirmation position CP in the slide operation that is being performed from the in-range region A1 toward the out-of-range region A2 is equal to or more than a threshold value (which may be the same threshold value as in the case of the third condition), which has been determined in advance, the panel controller 21 judges that the password input acceptance condition has been fulfilled. In this case, even when the operation position in the slide operation is not moved from the in-range region A1 into the out-of-range region A2, if the moving speed of the slide operation at the confirmation position CP (corresponding to the graduation indicating "0") is equal to or more than the threshold value, the panel controller 21 judges that the password input acceptance condition has been fulfilled. Further, even when the moving speed in the slide operation at the confirmation position CP is equal to or more than the threshold value, if a moving direction in the slide operation is a direction (leftward direction) from the out-of-range region A2 toward the in-range region A1, the panel controller 21 does not judge that the password input acceptance condition has been fulfilled.

Figure 6:
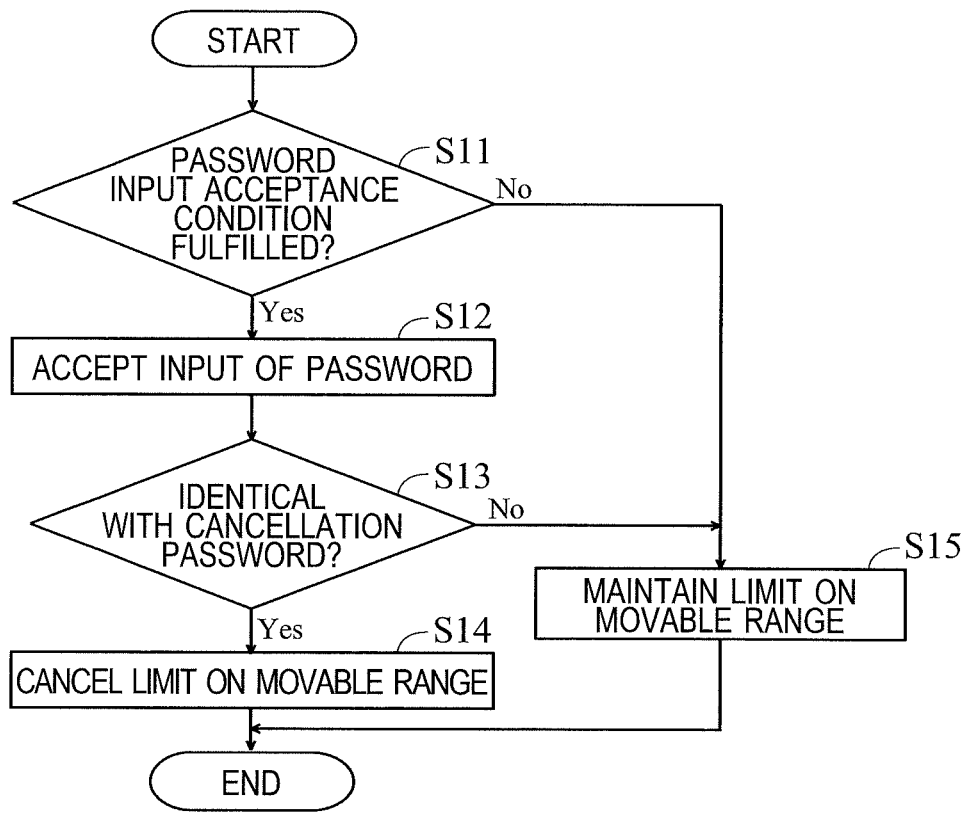
FIG. 6 is a flowchart illustrating a flow of limit cancellation processing performed by the panel controller of the operation panel according to the embodiment of the present disclosure.

Back to FIG. 6, in step S11, in a case where the panel controller 21 has judged that the password input acceptance condition has been fulfilled, the flow proceeds to step S12. In step S12, the panel controller 21 makes the touch screen 23 perform acceptance of an input of a password.

Figure 11:
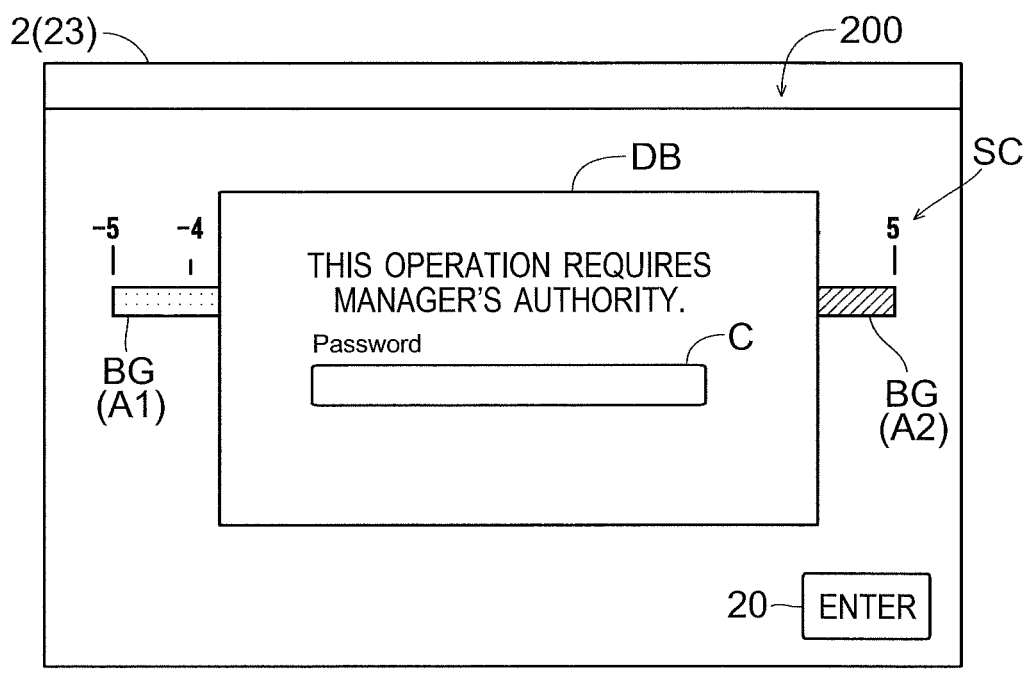
FIG. 11 is a diagram illustrating a dialog box that is displayed on the setting screen by the operation panel according to the embodiment of the present disclosure.

At this time, the touch screen 23 displays a dialogue box DB like the ones illustrated in FIG. 11 on the setting screen 200 as a popup image to accept an input of a password from the user. At this time, for example, the touch screen 23 may display a software keyboard via which to input a password. Here, in a case where a ten-key pad is included in the hardware buttons 24 on the operation panel 2, the password can be inputted by using the ten-key pad, too. The password having been inputted by the user is displayed in an input column C.

Back to FIG. 6, when the user inputs a password, in step S13, the panel controller 21 recognizes the input password that the user has inputted, and judges whether or not the input password is identical with the limit cancellation password. In a case where, as a result, the panel controller 21 has judged that the input password is identical with the cancellation password, the flow proceeds to step S14, while in a case where the panel controller 21 has judged that the input password is not identical with the cancellation password, the flow proceeds to step S15.

Figure 12:
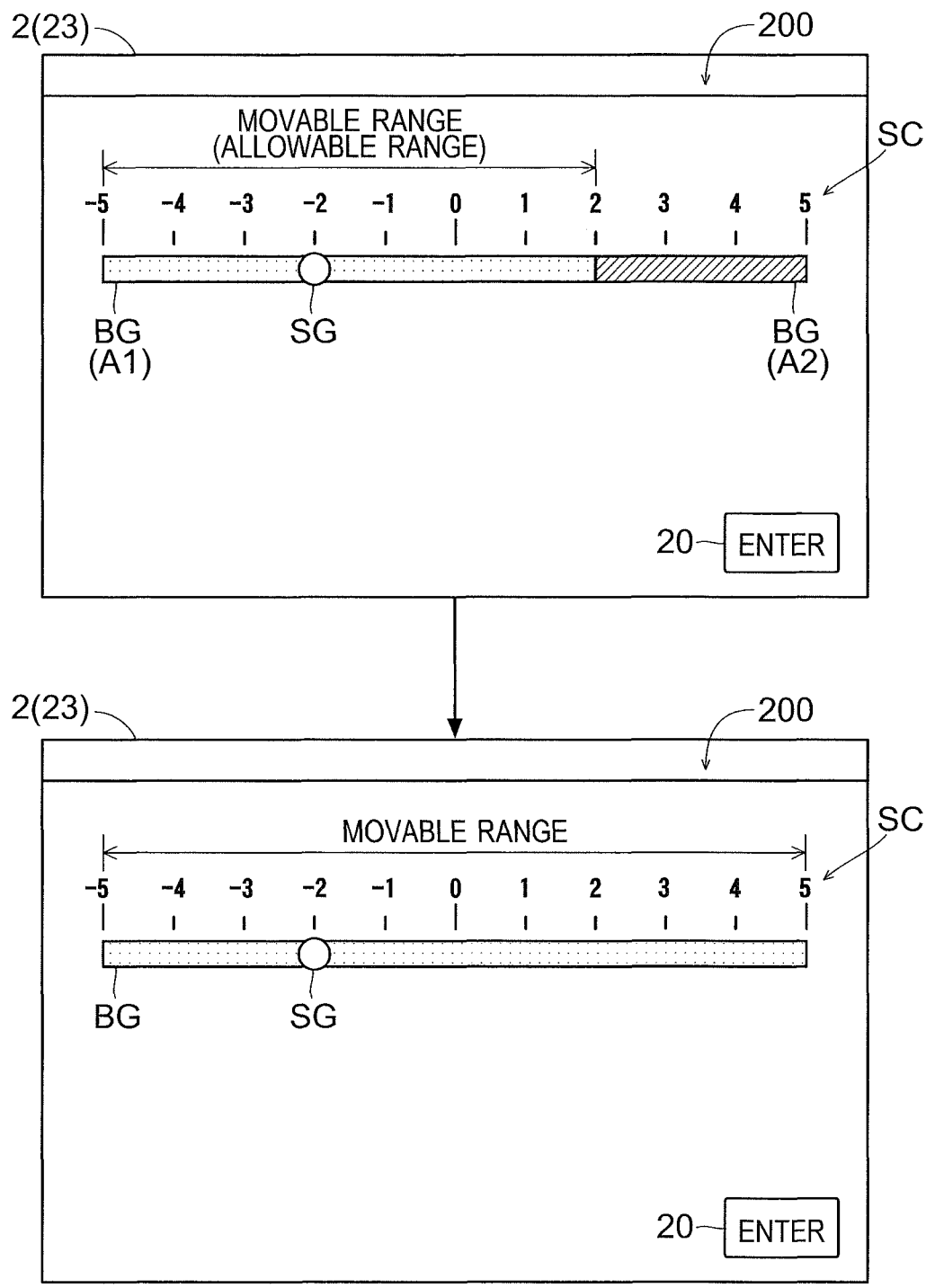
FIG. 12 is a diagram illustrating how screens change from one to another in a case where an input password inputted via the operation panel according to the embodiment of the present disclosure is identical with a cancellation password.

In step S14, the panel controller 21 cancels the limit put on the movable range of the slider image SG on the bar image BG. At this time, the panel controller 21 makes the touch screen 23 display the bar image BG in a uniform display fashion (display color) over the entire display region of the bar image BG. That is, the touch screen 23 changes the display fashion of the bar image BG from the state illustrated in the upper diagram of FIG. 12 to the state illustrated in the lower diagram of FIG. 12.

In step S15, the panel controller 21 does not cancel the limit put on the movable range of the slider image SG on the bar image BG. That is, the panel controller 21 makes the touch screen 23 continue the display processing of displaying the in-range region A1 and the out-of-range region A2 in different display fashions (display colors). Here, also in a case where, in step S11, the panel controller 21 has judged that the password input acceptance condition has not been fulfilled, the flow proceeds to step S15. Thereafter, with a general user using the multifunction peripheral 100, while having the touch screen 23 display the setting screen 200, the panel controller 21 performs the processing of step S11.

In this embodiment, as described above, when performing the range limiting processing (the processing of putting a limit on the movable range of the slider image SG) based on the allowable range, which have been set in advance, the panel controller 21 makes the touch screen 23 display the bar image BG such that the in-range region A1 and the out-of-range region A2 in the bar image BG are displayed in different display fashions (makes the touch screen 23 display the setting screen 200 on which the bar image BG and the slider image SG are arranged). With this arrangement, a user who is going to perform an input operation with respect to the setting screen 200 can recognize the movable range (that is, the allowable range) of the slider image SG just by checking the display fashion of the bar image BG (without asking another user for help), and this is convenient to the user.

In this embodiment, as described above, the touch screen 23 displays the in-range region A1 and the out-of-range region A2 in different display colors. This makes it easy to distinguish the in-range region A1 from the out-of-range region A2.

In this embodiment, as described above, the panel controller 21 performs the range limiting processing in cases where it is a general user who is using the multifunction peripheral 100 (the operation panel 2), and does not perform the range limiting processing in cases where it is a particular user who is using the multifunction peripheral 100 (the operation panel 2). Consequently, it is possible to put a limit on the movable range of the slider image SG (that is, to prevent a value out of the allowable range from being inputted) only when a general user is using the multifunction peripheral 100 (that is, when a general user is operating the operation panel 2).

In this embodiment, as described above, when a general user is using the multifunction peripheral 100 (when a general user is operating the operation panel 2), if the password input acceptance condition, which has been determined in advance, has been fulfilled, the panel controller 21 makes the touch screen 23 perform acceptance of an input of a password, and if the input password is identical with the cancellation password, the panel controller 21 makes the touch screen 23 display the bar image BG in a uniform display fashion over the entire region of the bar image BG, and cancels the limit put on the movable range of the slider image SG. This allows a general user to cancel the limit on the movable range of the slider image SG by himself or herself, without asking a particular user to cancel the limit put on the movable range of the slider image SG, and this is convenient to the user.

Here, a configuration is preferable in which, when the panel controller 21 has detected a movement of the operation position in a slide operation from the in-range region A1 into the out-of-range region A2, the panel controller 21 judges that the password input acceptance condition has been fulfilled; this is because such a movement indicates that it is highly possible that the user intends to input a value that is out of the allowable range. This is why the first condition is prepared as the password input acceptance condition.

Further, a configuration is preferable in which, when the panel controller 21 has detected a movement of the operation position in a slide operation from the in-range region A1 to the threshold position TP, the panel controller 21 judges that the password input acceptance condition has been fulfilled; this is because such a movement indicates that it is highly possible that the user intends to input a value that is out of the allowable range. This is why the second condition is prepared as the password input acceptance condition.

Further, a configuration is preferable in which, when the panel controller 21 has detected that the moving speed at the confirmation position CP in a slide operation performed from an in-range region A1 toward the out-of-range region A2 is equal to or more than the threshold value, which has been determined in advance, the panel controller 21 judges that the password input acceptance condition has been fulfilled; this is because such a moving speed indicates that it is highly possible that the user intends to input a value that is out of the allowable range. This is why the third condition is prepared as the password input acceptance condition.

Further, a configuration is preferable in which, when the panel controller 21 has detected that the moving speed at the confirmation position CP in a slide operation performed from an in-range region A1 toward an out-of-range region A2 is equal to or more than the threshold value, which has been determined in advance, the panel controller 21 judges that the password input acceptance condition has been fulfilled; this is because such a moving speed indicates that it is highly possible that the user intends to input a value that is out of the allowable range. This is why the fourth condition is prepared as the password input acceptance condition.

It should be understood that the embodiments disclosed herein are merely illustrative in all respects, and should not be interpreted restrictively. The range of the present disclosure is shown not by the above descriptions of embodiments but the scope of claims for patent, and it is intended that all modifications within the meaning and range equivalent to the scope of claims for patent are included.

What is claimed is:

1. A display/input device comprising:
   a touch screen which displays a bar image, displays a slider image on the bar image, and accepts, from a user, an operation of moving the slider image in an extension direction of the bar image as an input operation;
   a controller which controls the touch screen, and recognizes a value corresponding to a position of the slider image on the bar image as a value that the user intends to input; and
   a storage which stores therein an allowable range which is a range of a value that is allowed to input in the input operation and which is a previously set range,
   wherein,
   in performing range limiting processing of putting a limit on a movable range of the slider image based on the allowable range, the controller
      makes the touch screen display the bar image such that, of the bar image, an in-range region, which corresponds to the allowable range, and an out-of-range region, which is a region other than the in-range region, are displayed in different display fashions, and limits a movable range of the slider image to a range from one end to an other end of the in-range region which are opposite from each other in the extension direction;

the controller
judges whether a user who is using the display/input device is a general user or a particular user other than the general user, and
performs the range limiting processing when the user who is using the display/input device is the general user, but does not perform the range limiting processing when the user who is using the display/input device is the particular user;

the storage stores therein a cancellation password having been registered in advance; and the controller, when the general user is using the display/input device, makes the touch screen perform acceptance of an input of a password if a password input acceptance condition having been determined in advance is fulfilled, and then, if the password the input of which has been accepted is identical with the cancellation password, the controller makes the touch screen display the bar image in a uniform display fashion over an entire region, and cancels the limit put on the movable range of the slider image.

2. The display/Input device according to claim 1, wherein
the touch screen displays the in-range region and the out-of-range region in different display colors.

3. The display/input device according to claim 1, wherein
the operation of moving the slider image, which is performed as the input operation, includes a slide operation of bringing a contact body into contact with a display region of the slider image on the touch screen and then moving the contact body in the extension direction while maintaining the contact body in contact with the touch screen, and
on detecting a movement of an operation position in the slide operation from the in-range region into the out-of-range region, the controller judges that the password input acceptance condition has been fulfilled.

4. The display/input device according to claim 1, wherein
the operation of moving the slider image, which is performed as the input operation, includes a slide operation of bringing a contact body into contact with a display region of the slider image on the touch screen and then moving the contact body in the extension direction while maintaining the contact body in contact with the touch screen, and the controller sets a position that is away from a boundary between the in-range region and the out-of-range region toward the out-of-range region by a predetermined distance as a threshold position, and, on detecting a movement of an operation position in the slide operation from the in-range region to the threshold position, the controller judges that the password input acceptance condition has been fulfilled.

5. The display/input device according to claim 1, wherein
the operation of moving the slider image, which is performed as the input operation, includes a slide operation of bringing a contact body into contact with a display region of the slider image on the touch screen and then moving the contact body in the extension direction while maintaining the contact body in contact with the touch screen, and
the controller sets a boundary between the in-range region and the out-of-range region as a confirmation position, and detects a moving speed in the slide operation, and, on detecting that the moving speed at the confirmation position in the slide operation performed from the in-range region toward the out-of-range region is equal to or more than a threshold value having been determined in advance, the controller judges that the password input acceptance condition has been fulfilled.

6. The display/input device according to claim 1, wherein
the operation of moving the slider image, which is performed as the input operation, includes a slide operation of bringing a contact body into contact with a display region of the slider image on the touch screen and then moving the contact body in the extension direction while maintaining the contact body in contact with the touch screen, and
the controller sets a confirmation position between the one end and the other end of the in-range region, and detects a moving speed in the slide operation, and, on detecting that the moving speed at the confirmation position in the slide operation performed from the in-range region toward the out-of-range region is equal to or more than a threshold value having been determined in advance, the controller judges that the password input acceptance condition has been fulfilled.

7. An image forming apparatus comprising the display/input device according to claim 1.

* * * * *